(12) United States Patent
Fukui (10) Patent No.: US 6,992,304 B2
(45) Date of Patent: Jan. 31, 2006

(54) RADIATION IMAGE STORAGE PANEL

(75) Inventor: Shinichiro Fukui, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 144 days.

(21) Appl. No.: 10/358,355

(22) Filed: Feb. 5, 2003

(65) Prior Publication Data

US 2003/0146395 A1    Aug. 7, 2003

(30) Foreign Application Priority Data

Feb. 5, 2002   (JP) .............................. 2002-028368

(51) Int. Cl.
   *G03B 42/08*   (2006.01)
(52) U.S. Cl. ................................... 250/484.4
(58) Field of Classification Search ............. 250/484.4
   See application file for complete search history.

(56) References Cited

U.S. PATENT DOCUMENTS

| | | | |
|---|---|---|---|
| 4,239,968 A | 12/1980 | Kotera et al. | |
| 4,645,721 A * | 2/1987 | Arakawa et al. | 428/690 |
| 4,741,993 A | 5/1988 | Kano et al. | |
| 5,023,461 A * | 6/1991 | Nakazawa et al. | 250/484.4 |

FOREIGN PATENT DOCUMENTS

| | | |
|---|---|---|
| JP | 1-131496 | 5/1989 |
| JP | 10-12376 | 1/1998 |
| JP | 11-344698 | 12/1999 |

* cited by examiner

*Primary Examiner*—David Porta
*Assistant Examiner*—Shun Lee
(74) *Attorney, Agent, or Firm*—Sughrue Mion, PLLC

(57) ABSTRACT

A radiation image storage panel comprises a stimulable phosphor layer, which contains a stimulable phosphor, and a transparent protective layer overlaid on the stimulable phosphor layer. The transparent protective layer has a layer thickness of at most 50 $\mu$m and comprises at least four layers formed on a transparent protective layer support for supporting the transparent protective layer, the at least four layers comprising transparent inorganic layers and organic layers, which are located alternately. Each of the transparent inorganic layers contains a compound selected from the group consisting of a metal oxide, a metal nitride, and a metal oxynitride, and is formed with a vacuum deposition technique. Each of the organic layers is formed with a coating technique or a vacuum deposition technique.

4 Claims, 1 Drawing Sheet

RADIATION IMAGE STORAGE PANEL

BACKGROUND OF THE INVENTION

1. Field of the Invention

This invention relates to a radiation image storage panel for use in radiation image recording and reproducing techniques, in which stimulable phosphors are utilized.

2. Description of the Related Art

In lieu of conventional radiography, radiation image recording and reproducing techniques utilizing stimulable phosphors have heretofore been used in practice. The radiation image recording and reproducing techniques are described in, for example, U.S. Pat. No. 4,239,968. The radiation image recording and reproducing techniques utilize a radiation image storage panel (referred to also as the stimulable phosphor sheet) provided with a stimulable phosphor. With the radiation image recording and reproducing techniques, the stimulable phosphor of the radiation image storage panel is caused to absorb radiation, which carries image information of an object or which has been radiated out from a sample, and thereafter the stimulable phosphor is exposed to an electromagnetic wave (stimulating rays), such as visible light or infrared rays, which causes the stimulable phosphor to produce the fluorescence (i.e., to emit light) in proportion to the amount of energy stored thereon during its exposure to the radiation. The produced fluorescence (i.e., the emitted light) is photoelectrically detected to obtain an electric signal. The electric signal is then processed, and the processed electric signal is utilized for reproducing a visible image of the object or the sample. The radiation image storage panel, from which the electric signal has been obtained, is subjected to an erasing operation for erasing energy remaining on the radiation image storage panel, and the erased radiation image storage panel is utilized again for the image recording. Specifically, the radiation image storage panel is used repeatedly.

The radiation image recording and reproducing techniques have the advantages in that a radiation image containing a large amount of information is capable of being obtained with a markedly lower dose of radiation than in the conventional radiography utilizing a radiation film and an intensifying screen. Also, with the conventional radiography, the radiation film is capable of being used only for one recording operation. However, with the radiation image recording and reproducing techniques, the radiation image storage panel is used repeatedly. Therefore, the radiation image recording and reproducing techniques are advantageous also from the view point of resource protection and economic efficiency.

As described above, the radiation image recording and reproducing techniques are advantageous techniques for forming images. As in the cases of the intensifying screens utilized in the conventional radiography, it is desired that the radiation image storage panels utilized in the radiation image recording and reproducing techniques have the performance, such that the radiation image storage panels have a high sensitivity, yield good image quality, and endure a long period of use without the image quality of the radiation images becoming bad.

However, the stimulable phosphors utilized for the production of the radiation image storage panels ordinarily have high levels of water vapor absorbing characteristics and absorb moisture contained in air when being left within a room under ordinary weather conditions. Therefore, the stimulable phosphors have the problems in that the sensitivity of the stimulable phosphors with respect to the radiation becomes low as the amount of moisture absorbed by the stimulable phosphors becomes large, and the characteristics of the stimulable phosphors deteriorate markedly-with the passage of time.

Also, ordinarily, latent images of the radiation images having been recorded on the stimulable phosphors have the properties such that the latent images fade with the passage of time after the stimulable phosphors have been exposed to the radiation. Therefore, as the time occurring between when the stimulable phosphors are exposed to the radiation and when the stimulable phosphors are exposed to the stimulating rays becomes long, the intensities of the radiation image signals detected from the stimulable phosphors become low. In cases where the stimulable phosphors absorb water vapor, the rate of the fading of the latent images having been recorded on the stimulable phosphors becomes high. Therefore, in cases where the radiation image storage panels, whose stimulable phosphors have absorbed water vapor, are used, there has arisen a tendency toward low reproducibility of the image signals at the time of the readout of the radiation images.

In order for the deterioration phenomenon of the stimulable phosphors due to water vapor absorption to be eliminated, for example, there has heretofore been employed a technique, wherein a stimulable phosphor is covered with a film of a polytrifluorochloroethylene, or the like, acting as a water vapor proof protective layer having a low water vapor transmission rate, and the amount of moisture reaching the stimulable phosphor layer is thus reduced. However, the aforesaid technique for eliminating the deterioration phenomenon of the stimulable phosphors due to moisture absorption has the problems in that the cost of the aforesaid film of the polytrifluorochloroethylene, or the like, is high, and the thickness of the film is large. The aforesaid technique for eliminating the deterioration phenomenon of the stimulable phosphors due to moisture absorption also has the problems in that the film of the polytrifluorochloroethylene, or the like, is produced by use of FREON chlorofluorocarbons as a raw material, and therefore causes environmental pollution to occur.

Also, a constitution comprising two kinds of protective layers having different levels of water vapor absorbing characteristics, wherein one protective layer having a higher level of water vapor absorbing characteristics than the water vapor absorbing characteristics of the other protective layer is located on the side of a phosphor layer, is described in, for example, U.S. Pat. No. 4,741,993. Further, a constitution, wherein a protective layer contains a silicon compound containing nitrogen and oxygen, is described in, for example, Japanese Unexamined Patent Publication No. 1 (1989)-131496. However, water vapor proof characteristics, which are achieved by each of the constitutions described above, are not necessarily of a satisfactory level. Furthermore, a technique for utilizing a laminated film for an electric field fluorescent lamp, where in the laminated film is formed by laminating two to eight films, each of which has been prepared by forming a thin layer of a metal oxide, silicon nitride, or the like, on a polyethylene terephthalate (PET) film with vacuum evaporation, is described in, for example, Japanese Unexamined Patent Publication No. 10(1998)-12376. However, with the laminated film described above, the problems with regard to image defects due to the water vapor proof protective film, image defects due to a condition of adhesion between the water vapor proof protective film and a phosphor surface, and the like, occur. Therefore, the laminated film described above cannot be employed as a water vapor proof protective film for the radiation image storage panels, which are exclusively used for obtaining medical images for making a diagnosis of an illness.

Also, as a constitution for used in a radiation image storage panel, a constitution, wherein a laminated film comprising a plurality of resin films, which contain at least one metal oxide evaporated resin film and have been adhered to one another in a layer form, is located on the side of a phosphor layer surface, is proposed in, for example, Japanese Unexamined Patent Publication No. 11(1999)-344698. However, with the proposed constitution, wherein the laminated film is adhered by an adhesive layer to the phosphor layer surface, the problems occur in that nonuniformity occurs with images, depending upon the condition of the adhesion of the laminated film. Also, with the proposed constitution, the problems occur in that the thickness of the entire water vapor proof layer becomes large, and the image quality becomes bad.

SUMMARY OF THE INVENTION

The primary object of the present invention is to provide a radiation image storage panel, which has good water vapor proof characteristics and a high durability, which is capable of being used in good conditions for a long period of time, and which has a high sensitivity and is capable of yielding good image quality.

The present invention provides a radiation image storage panel, comprising a stimulable phosphor layer, which contains a stimulable phosphor, and a transparent protective layer overlaid on the stimulable phosphor layer, wherein the transparent protective layer has a layer thickness of at most 50 $\mu$m and comprises at least four layers formed on a transparent protective layer support for supporting the transparent protective layer, the at least four layers comprising transparent inorganic layers and organic layers, which are located alternately.

In the radiation image storage panel in accordance with the present invention, the at least four layers comprising the transparent inorganic layers and the organic layers, which are located alternately, are formed on the transparent protective layer support. Specifically, the layer, which is formed directly on the transparent protective layer support, may be one of the transparent inorganic layers. Alternatively, the layer, which is formed directly on the transparent protective layer support, may be one of the organic layers. Also, the layer, which is formed at the position remotest from the transparent protective layer support, may be one of the transparent inorganic layers. Alternatively, the layer, which is formed at the position remotest from the transparent protective layer support, may be one of the organic layers. The transparent protective layer has a layer thickness of at most 50 $\mu$m. The transparent protective layer should preferably have a layer thickness of at most 25 $\mu$m.

The radiation image storage panel in accordance with the present invention should preferably be modified such that each of the transparent inorganic layers contains a compound selected from the group consisting of a metal oxide, a metal nitride, and a metal oxynitride, and is formed with a vacuum deposition technique.

Also, the radiation image storage panel in accordance with the present invention should preferably be modified such that each of the organic layers is formed with a technique selected from the group consisting of a coating technique and a vacuum deposition technique.

The present invention also provides a radiation image storage panel, comprising a stimulable phosphor layer, which contains a stimulable phosphor, and a transparent protective layer overlaid on the stimulable phosphor layer, wherein the transparent protective layer has an air transmission rate at 25° C. of at most 0.5 cc/m$^2$/24 h and a water vapor transmission rate of at most 0.5 g/m$^2$/24 h.

The radiation image storage panel in accordance with the present invention comprises the stimulable phosphor layer, which contains the stimulable phosphor, and the transparent protective layer overlaid on the stimulable phosphor layer. The transparent protective layer comprises at least four layers formed on the transparent protective layer support for supporting the transparent protective layer, the at least four layers comprising the transparent inorganic layers and the organic layers, which are located alternately. Therefore, the radiation image storage panel in accordance with the present invention has markedly good water vapor proof characteristics and a markedly high durability. Also, the radiation image storage panel in accordance with the present invention, wherein the transparent protective layer has a layer thickness of at most 50 $\mu$m, has a high sensitivity and is capable of yielding good image quality.

The radiation image storage panel in accordance with the present invention may be modified such that each of the transparent inorganic layers contains the compound selected from the group consisting of the metal oxide, the metal nitride, and the metal oxynitride, and is formed with the vacuum deposition technique. Also, the radiation image storage panel in accordance with the present invention may be modified such that each of the organic layers is formed with the technique selected from the group consisting of the coating technique and the vacuum deposition technique. With each of the modifications described above, the water vapor proof characteristics of the radiation image storage panel are capable of being enhanced even further. Also, with each of the modifications described above, since each of the transparent inorganic layers and each of the organic layers need not be adhered with an adhesive agent to each other, the problems are capable of being prevented from occurring in that nonuniformity occurs with images due to the condition of the adhesion of layers. Further, with each of the modifications described above, the thickness of the entire transparent protective layer is capable of being set at a small value, and therefore good image quality is capable of being obtained.

DESCRIPTION OF THE PREFERRED EMBODIMENTS

The present invention will hereinbelow be described in further detail with reference to the accompanying drawings.

Figure 1:
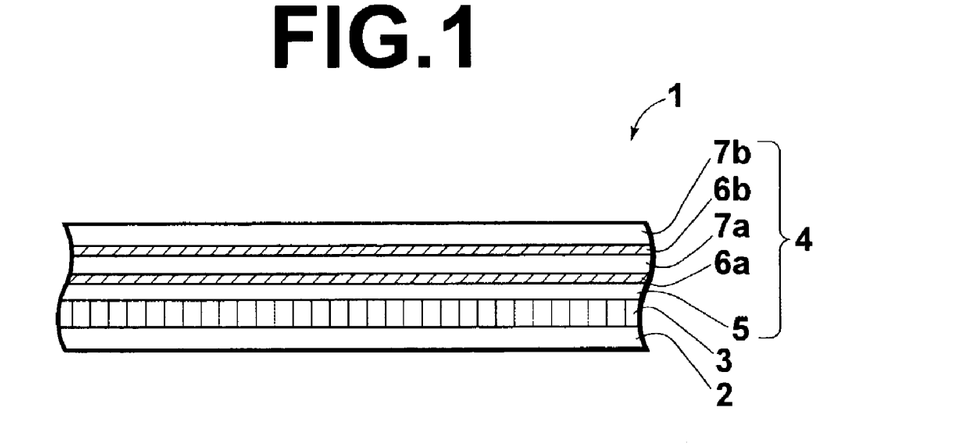
FIG. 1 is a schematic sectional view showing a first embodiment of the radiation image storage panel in accordance with the present invention.
Figure 2:
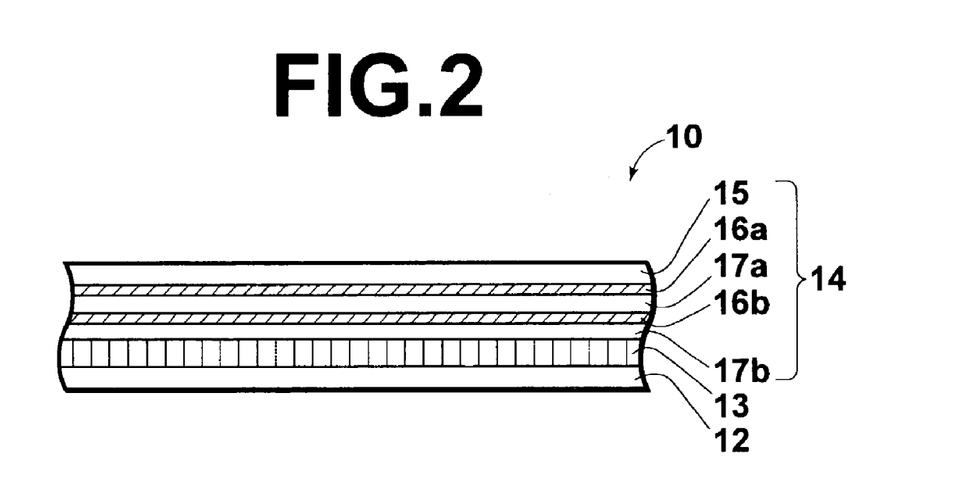
FIG. 2 is a schematic sectional view showing a second embodiment of the radiation image storage panel in accordance with the present invention.

FIG. 1 is a schematic sectional view showing a first embodiment of the radiation image storage panel in accordance with the present invention. FIG. 2 is a schematic sectional view showing a second embodiment of the radiation image storage panel in accordance with the present invention.

As illustrated in FIG. 1, a radiation image storage panel 1, which is the first embodiment of the radiation image storage panel in accordance with the present invention, comprises a substrate 2. The radiation image storage panel 1 also comprises a stimulable phosphor layer 3 and a transparent protective layer 4, which are overlaid on the substrate 2. The transparent protective layer 4 comprises a transparent protective layer support 5 for supporting the transparent protective layer 4. The transparent protective layer 4 also comprises a first transparent inorganic layer 6a, a first organic layer 7a, a second transparent inorganic layer 6b, and a second organic layer 7b, which are overlaid in this order on the transparent protective layer support 5. In the first embodiment of FIG. 1, the first transparent inorganic layer 6a is formed directly on the transparent protective layer support 5. Alternatively, an organic layer may be formed directly on the transparent protective layer support 5. In such cases, if four layers comprising the transparent inorganic layers and the organic layers, which are located alternately, are formed on the transparent protective layer support 5, a top layer, which is remotest from the transparent protective layer support 5 among the layers constituting the radiation image storage panel 1, will be constituted of a transparent inorganic layer. In this manner, the radiation image storage panel 1 may be modified such that the top layer, which is remotest from the transparent protective layer support 5 among the layers constituting the radiation image storage panel 1, is constituted of the transparent inorganic layer. Also, in such cases, if it is necessary, for reasons of a process for producing the radiation image storage panel or for special use of the radiation image storage panel, that the top surface of the radiation image storage panel 1 is constituted of an organic layer, the organic layer may be overlaid even further on the transparent inorganic layer. Further, in the first embodiment of FIG. 1, by way of example, the four layers comprising the transparent inorganic layers and the organic layers, which are located alternately, are formed on the transparent protective layer support 5. Alternatively, an odd number of layers, e.g. five layers, may be formed on the transparent protective layer support 5, such that the layer thickness of the entire transparent protective layer is at most 50 $\mu$m. As another alternative, at least six layers may be formed on the transparent protective layer support 5, such that the layer thickness of the entire transparent protective layer is at most 50 $\mu$m. Furthermore, each of the organic layers or each of the transparent inorganic layers may be formed in a plurality of steps and may thus be constituted of a plurality of sublayers.

The layer thickness of each of the first transparent inorganic layer 6a and the second transparent inorganic layer 6b may take one of various values, depending upon the number of the transparent inorganic layers and the organic layers, which are located alternately. The layer thickness of each of the first transparent inorganic layer 6a and the second transparent inorganic layer 6b may ordinarily fall within the range of 10 nm to 1,000 nm. The layer thickness of each of the first transparent inorganic layer 6a and the second transparent inorganic layer 6b should preferably fall within the range of 15 nm to 700 nm, and should more preferably fall within the range of 20 nm to 500 nm. If the layer thickness of each of the first transparent inorganic layer 6a and the second transparent inorganic layer 6b is smaller than 10 nm, for example, holes will occur through the transparent inorganic layer, and a uniform and smooth transparent inorganic layer cannot always be formed. Also, in such cases, a sufficient water vapor proof effect cannot be obtained. If the layer thickness of each of the first transparent inorganic layer 6a and the second transparent inorganic layer 6b is larger than 1,000 nm, the formed transparent inorganic layer will be apt to suffer from peeling and cracking.

The layer thickness of each of the first organic layer 7a and the second organic layer 7b may take one of various values, depending upon the number of the transparent inorganic layers and the organic layers, which are located alternately. The layer thickness of each of the first organic layer 7a and the second organic layer 7b may ordinarily fall within the range of 0.25 $\mu$m to 10 $\mu$m. The layer thickness of each of the first organic layer 7a and the second organic layer 7b should preferably fall within the range of 0.3 $\mu$m to 7 $\mu$m, and should more preferably fall within the range of 0.5 $\mu$m to 5 $\mu$m. If the layer thickness of each of the first organic layer 7a and the second organic layer 7b is smaller than 0.25 $\mu$m, for example, holes will occur through the organic layer, and a uniform and smooth organic layer cannot always be formed. Also, in such cases, a sufficient water vapor proof effect cannot be obtained. If the layer thickness of each of the first organic layer 7a and the second organic layer 7b is larger than 10 $\mu$m, good image quality cannot always be obtained.

The layer thickness of the entire transparent protective layer 4 is at most 50 $\mu$m. The layer thickness of the entire transparent protective layer 4 should preferably be at most 25 $\mu$m. If the layer thickness of the entire transparent protective layer 4 is larger than 50 $\mu$m, good image quality cannot always be obtained.

With the radiation image storage panel in accordance with the present invention, the transparent protective layer comprises at least four layers formed on the transparent protective layer support for supporting the transparent protective layer, the at least four layers comprising the transparent inorganic layers and the organic layers, which are located alternately. Therefore, with the radiation image storage panel in accordance with the present invention, good water vapor proof performance is capable of being obtained. In such cases, basically, it is sufficient for the transparent protective layer to be overlaid on the stimulable phosphor layer. Specifically, as in the first embodiment described above, the transparent protective layer 4 may be overlaid on the stimulable phosphor layer 3 such that the transparent protective layer support 5 is in contact with the stimulable phosphor layer 3. Alternatively, the radiation image storage panel in accordance with the present invention may be constituted as a radiation image storage panel 10 shown in FIG. 2, which constitutes a second embodiment of the radiation image storage panel in accordance with the present invention. The radiation image storage panel 10 comprises a substrate 12. The radiation image storage panel 10 also comprises a stimulable phosphor layer 13, which contains a stimulable phosphor, and a transparent protective layer 14, which are overlaid on the substrate 12. Also, the transparent protective layer 14 comprises a transparent protective layer support 15 for supporting the transparent protective layer 14. The transparent protective layer 14 also comprises a first transparent inorganic layer 16a, a first organic layer 17a, a second transparent inorganic layer 16b, and a second organic layer 17b, which are overlaid in this order on the transparent protective layer support 15. The transparent protective layer 14 is located on the stimulable phosphor layer 13 such that the second organic layer 17b is in contact with the stimulable phosphor layer 13. The radiation image storage panel 10 may be modified such that a third transparent inorganic layer is formed even further on the second organic layer 17b, and the transparent protective layer 14 may be located on the stimulable phosphor layer 13 such that the third transparent inorganic layer is in contact with the stimulable phosphor layer 13.

The transparent protective layer of the radiation image storage panel in accordance with the present invention may be formed in the manner described below. Specifically, the transparent protective layer support is firstly formed on the stimulable phosphor layer with an adhesion technique using an adhesive agent, or the like, or with a reduced pressure lamination technique. The first transparent inorganic layer is then formed on the transparent protective layer support with a vacuum deposition technique, and the first organic layer is thereafter formed on the first transparent inorganic layer with a coating technique or the vacuum deposition technique. Thereafter, in the same manner as that described above, the second transparent inorganic layer and the second organic layer are formed successively.

Alternatively, the transparent protective layer of the radiation image storage panel in accordance with the present invention may be formed in the manner described below. Specifically, after the transparent protective layer has been prepared, the transparent protective layer is overlaid on the stimulable phosphor layer. More specifically, the first transparent inorganic layer is formed on the transparent protective layer support with the vacuum deposition technique, and the first organic layer is then formed on the first transparent inorganic layer with the coating technique or the vacuum deposition technique. Thereafter, in the same manner as that described above, the second transparent inorganic layer and the second organic layer are formed successively. In this manner, the transparent protective layer is prepared. Thereafter, the transparent protective layer support of the thus prepared transparent protective layer is adhered to the stimulable phosphor layer by use of an adhesive agent, or the like. Alternatively, the organic layer or the transparent inorganic layer, which constitutes the layer remotest from the transparent protective layer support among the layers constituting the transparent protective layer, may be combined with the stimulable phosphor layer with the adhesion technique using an adhesive agent, or the like, or with the reduced pressure lamination technique.

Each of the transparent inorganic layers may be a transparent evaporated layer formed with a vacuum evaporation technique utilizing an inorganic material, which exhibits no light absorption with respect to light having wavelengths falling within the range of 300 nm to 1,000 nm and has gas barrier characteristics. Examples of the inorganic materials, which exhibit no light absorption with respect to the light having wavelengths falling within the range of 300 nm to 1,000 nm, include silicon oxide, silicon nitride, aluminum oxide, aluminum nitride, zirconium oxide, tin oxide, silicon oxynitride, and aluminum oxynitride. Aluminum oxide and silicon oxide may be subjected alone to the vacuum evaporation technique. However, in cases where aluminum oxide and silicon oxide are subjected together to the vacuum evaporation technique, the gas barrier characteristics are capable of being enhanced. Therefore, in cases where aluminum oxide and silicon oxide are utilized for the formation of the transparent inorganic layer, aluminum oxide and silicon oxide should preferably be subjected together to the vacuum evaporation technique. Among the above-enumerated inorganic materials, silicon oxynitride and aluminum oxynitride have a high light transmittance and good gas barrier characteristics. Specifically, with silicon oxynitride or aluminum oxynitride, a dense film free from cracks and micro-pores is capable of being formed. Therefore, silicon oxynitride and aluminum oxynitride are more preferable as the inorganic materials.

As described above, the transparent inorganic layer is formed directly on the transparent protective layer support or the organic layer with the vacuum deposition technique. In such cases, the transparent protective layer support or the organic layer should preferably be free from fillers of at least 50 nm or having an aspect ratio of at most 10. The vacuum deposition technique may be a sputtering technique, a physical vapor deposition technique (i.e., the PVD technique), a chemical vapor deposition technique (i.e., the CVD technique), or the like. With any of the above-enumerated techniques, the transparency and the barrier characteristics of the obtained transparent inorganic layer do not vary largely. Therefore, the vacuum deposition technique may be selected appropriately from the above-enumerated techniques. However, from the view point of easiness and simplicity of layer formation, the CVD technique is preferable as the vacuum deposition technique. Particularly, a plasma enhanced CVD technique (i.e., the PE-CVD technique), an ECR-PE-CVD technique, and the like, are preferable.

The organic layer may be constituted of a transparent high-molecular weight material. Examples of the transparent high-molecular weight materials include cellulose derivatives, such as cellulose acetate and nitrocellulose; and synthetic high-molecular weight materials, such as a polymethyl methacrylate, a polyvinyl butyral, a polyvinyl formal, a polycarbonate, a polyvinyl acetate, a vinyl chloride-vinyl acetate copolymer, a fluorine type of resin, a polyethylene, a polypropylene, a polyester, an acrylic resin, a poly-para-xylene, a polyethylene terephthalate (PET), hydrochlorinated rubber, and a vinylidene chloride copolymer. The above-enumerated synthetic high-molecular weight materials for the formation of the organic layer may be utilized in the form of the polymers. Alternatively, monomers for forming the above-enumerated synthetic high-molecular weight materials may be utilized in order to form the organic layer.

Such that the coating characteristics of the organic layer composition, the vacuum evaporation characteristics of the organic layer composition, and the physical properties of the thin film after being hardened may be enhanced, and such that photosensitive properties may be imparted to the coating film, various additives may be contained in the organic layer in accordance with the purposes. Examples of the additives include various kinds of polymers and monomers having a hydroxyl group; coloring agents, such as pigments and dyes; stabilizing agents, such as anti-yellowing agents, age resistors, and ultraviolet light absorbers; thermal acid generating agents; photosensitive acid generating agents; surface active agents; solvents; crosslinking agents; hardening agents; and polymerization inhibitors.

The organic layer may be formed in the manner described below. Specifically, a coating composition for the formation of the organic layer is prepared by mixing together a polymer acting as a raw material or monomers acting raw materials, various additives, and a solvent. The thus prepared coating composition for the formation of the organic layer is applied onto the inorganic layer by use of coating means, such as a doctor blade, a dip coater, a slide coater, or an extrusion coater. The applied coating composition for the formation of the organic layer is then dried and hardened. Alternatively, the organic layer may be formed with the vacuum deposition technique as in the case of the organic layer.

The transparent protective layer support may be constituted of a plastic sheet made from a PET, a polyurethane, a polyethylene naphthalate, a polyethylene, a polypropylene, a polyvinylidene chloride, or a polyamide. The transparent protective layer support may be prepared with the thin film formation using the raw material, which is employed for the formation of the organic layer described above.

Such that the durability may be enhanced, and nonuniformity may be prevented from occurring, the organic layer and the transparent protective layer support of the radiation image storage panel in accordance with the present invention may contain organic powder or inorganic powder. In such cases, the organic powder or the inorganic powder may be contained in a proportion falling within the range of 0.5% by weight to 60% by weight with respect to the weight of the organic layer, and should preferably be contained in a proportion falling within the range of approximately 5% by weight to approximately 50% by weight with respect to the weight of the organic layer. The powder may exhibit light absorption with respect to the light having wavelengths of a specific wavelength range and may be, for example, ultramarine blue, or the like. However, ordinarily, white powder, which does not exhibit specific light absorption with respect to the light having wavelengths of 300 nm to 900 nm, is preferable. The mean particle diameter of the powder should preferably fall within the range of approximately 0.01 $\mu$m to approximately 10 $\mu$m, and should more preferably fall within the range of approximately 0.3 $\mu$m to approximately 3 $\mu$m. Ordinarily, the particles have a certain distribution of the particle size. The distribution of the particle size should preferably be as narrow as possible.

In order for the transparent protective layer to be overlaid on the stimulable phosphor layer, the side of the transparent protective layer support, the side of the organic layer, or the side of the transparent inorganic layer of the transparent protective layer may be combined with the stimulable phosphor layer in a dry atmosphere by use of the adhesion technique using an adhesive agent or by use of the reduced pressure lamination technique. In such cases, the transparent protective layer should preferably be overlaid on the stimulable phosphor layer with reduced pressure sealing. In cases where the reduced pressure sealing is utilized, peeling of the transparent protective layer support, the organic layer, or the transparent inorganic layer from the stimulable phosphor layer, particularly under a low atmospheric pressure condition, is capable of being suppressed.

The adhesive agent for adhering the transparent protective layer support to the stimulable phosphor layer or for adhering the organic layer to the stimulable phosphor layer may be selected from a wide variety of adhesive agents. Examples of the adhesive agents include a vinyl type of adhesive agent, an acrylic type of adhesive agent, a polyamide type of adhesive agent, an epoxy type of adhesive agent, a rubber type of adhesive agent, and a urethane type of adhesive agent.

Also, in order for water vapor absorption from side faces of the stimulable phosphor layer to be prevented sufficiently, the side faces of the radiation image storage panel should preferably be sealed with glass, an epoxy resin, a UV curing resin, or a metal (a solder). Further, in order for deterioration of performance due to water vapor absorption of the stimulable phosphor layer to be prevented from occurring, the operations ranging from the taking of the radiation image storage panel out of a vacuum evaporation tank (i.e., a vacuum evaporation machine) to the sealing of the end faces of the radiation image storage panel should preferably be performed in a vacuum, dry air, an inert gas, or a hydrophobic inert gas.

The stimulable phosphor, which constitutes the stimulable phosphor layer in the radiation image storage panel in accordance with the present invention, should preferably be, for example, a stimulable phosphor represented by Formula (I) shown below, as described in Japanese Patent Publication No. 7(1995)-84588.

$$(M_{1-f}M'_f)X \cdot bM'''X''_3 : cA \qquad (I)$$

From the view point of the luminance of the light emitted by the stimulable phosphor, in Formula (I) shown above, $M^I$ should preferably be at least one kind of alkali metal selected from the group consisting of Rb, Cs, Cs-containing Na, and Cs-containing K, particularly at least one kind of alkali metal selected from the group consisting of Rb and Cs. Also, $M^{III}$ should preferably be at least one kind of trivalent metal selected from the group consisting of Y, La, Lu, Al, Ga, and In. Further, X" should preferably be at least one kind of halogen selected from the group consisting of F, Cl, and Br. The value of b representing the content of $M^{III}X''_3$ should preferably be selected from the range of $0 \leq b \leq 10^{-2}$.

Furthermore, in Formula (I) shown above, A acting as the activator should preferably be at least one kind of metal selected from the group consisting of Eu, Tb, Ce, Tm, Dy, Ho, Gd, Sm, Tl, and Na, particularly at least one kind of metal selected from the group consisting of Eu, Ce, Sm, Tl, and Na. Also, from the view point of the luminance of the light emitted by the stimulable phosphor, the value of c representing the quantity of the activator should preferably be selected from the range of $10^{-6} < c < 0.1$.

Examples of the other stimulable phosphors, which may also be employed in the radiation image storage panel in accordance with the present invention, include the following:

a phosphor represented by the formula SrS:Ce, Sm; SrS:Eu, Sm; ThO$_2$:Er; or La$_2$O$_2$S:Eu, Sm, as described in U.S. Pat. No. 3,859,527, a phosphor represented by the formula ZnS:Cu, Pb; BaO.xAl$_2$O$_3$:Eu wherein $0.8 \leq x \leq 10$; $M^{II}$O.xSiO$_2$:A wherein $M^{II}$ is Mg, Ca, Sr, Zn, Cd, or Ba, A is Ce, Tb, Eu, Tm, Pb, Tl, Bi, or Mn, and x is a number satisfying $0.5 \leq x \leq 2.5$; or LnOX:xA wherein Ln is at least one of La, Y, Gd, and Lu, X is at least one of Cl and Br, A is at least one of Ce and Tb, x is a number satisfying $0 < x < 0.1$, as disclosed in U.S. Pat. No. 4,236,078, a phosphor represented by the formula $(Ba_{1-x-y}, Mg_x, Ca_y)$FX:aEu$^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$, as disclosed in DE-OS No. 2,928,245, a phosphor represented by the formula $(Ba_{1-x}, M^{2+}_x)$FX:yA wherein $M^{2+}$ is at least one of Mg, Ca, Sr, Zn, and Cd, X is at least one of Cl, Br, and I, A is at least one of Eu, Tb, Ce, Tm, Dy, Pr, Ho, Nd, Yb, and Er, x is a number satisfying $0 \leq x \leq 0.6$, and y is a number satisfying $0 \leq y \leq 0.2$, as disclosed in U.S. Pat. No. 4,239,968, a phosphor represented by the formula $M^{II}$FX.xA:yLn wherein $M^{II}$ is at least one of Ba, Ca, Sr, Mg, Zn, and Cd, A is at least one of BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$, and ThO$_2$, Ln is at least one of Eu, Tb, Ce, Tm, Dy, Pr, Ho, Nd, Yb, Er, Sm, and Gd, X is at least one of Cl, Br, and I, x is a number satisfying $5 \times 10^{-5} \leq x \leq 0.5$, and y is a number satisfying $0<y\leq 0.2$, as described in Japanese Unexamined Patent Publication No. 55(1980)-160078, a phosphor represented by the formula $(Ba_{1-x}M''_x)F_2.aBaX_2:yEu,zA$ wherein $M''$ is at least one of beryllium, magnesium, calcium, strontium, zinc, and cadmium, X is at least one of chlorine, bromine, and iodine, A is at least one of zirconium and scandium, a is a number satisfying $0.5\leq a\leq 1.25$, x is a number satisfying $0\leq x\leq 1$, y is a number satisfying $10^{-6}\leq y\leq 2\times 10^{-1}$, and z is a number satisfying $0<z\leq 10^{-2}$, as described in Japanese Unexamined Patent Publication No. 56(1981)-116777, a phosphor represented by the formula $(Ba_{1-x}M''_x)F_2.aBaX_2:yEu, zB$ wherein $M''$ is at least one of beryllium, magnesium, calcium, strontium, zinc, and cadmium, X is at least one of chlorine, bromine, and iodine, A is a number satisfying $0.5\leq a\leq 1.25$, x is a number satisfying $0\leq x\leq 1$, y is a number satisfying $10^{-6}\leq y\leq 2\times 10^{-1}$, and z is a number satisfying $0<z\leq 10^{-2}$, as described in Japanese Unexamined Patent Publication No. 57(1982)-23673, a phosphor represented by the formula $(Ba_{1-x}M''_x)F_2.aBaX_2:yEu,zA$ wherein $M''$ is at least one of beryllium, magnesium, calcium, strontium, zinc, and cadmium, X is at least one of chlorine, bromine, and iodine, A is at least one of arsenic and silicon, a is a number satisfying $0.5\leq a\leq 1.25$, x is a number satisfying $0\leq x\leq 1$, y is a number satisfying $10^{-6}\leq y\leq 2\times 10^{-1}$, and z is a number satisfying $0<z\leq 5\times 10^{-1}$, as described in Japanese Unexamined Patent Publication No. 57(1982)-23675, a phosphor represented by the formula $M'''OX:xCe$ wherein $M'''$ is at least one trivalent metal selected from the group consisting of Pr, Nd, Pm, Sm, Eu, Tb, Dy, Ho, Er, Tm, Yb, and Bi, X is either one or both of Cl and Br, and x is a number satisfying $0<x<0.1$, as described in Japanese Unexamined Patent Publication No. 58(1983)-69281, a phosphor represented by the formula $Ba_{1-x}M_{x/2}L_{x/2}FX:yEu^{2+}$ wherein M is at least one alkaline metal selected from the group consisting of Li, Na, K, Rb, and Cs, L is at least one trivalent metal selected from the group consisting of Sc, Y, La, Ce, Pr, Nd, Pm, Sm, Gd, Tb, Dy, Ho, Er, Tm, Yb, Lu, Al, Ga, In, and Tl, X is at least one halogen selected from the group consisting of Cl, Br, and I, x is a number satisfying $10^{-2}\leq x\leq 0.5$, and y is a number satisfying $0<y\leq 0.1$, as described in Japanese Unexamined Patent Publication No. 58(1983)-206678, a phosphor represented by the formula $BaFX.xA:yEu^{2+}$ wherein X is at least one halogen selected from the group consisting of Cl, Br, and I, A is a calcination product of a tetrafluoro boric acid compound, x is a number satisfying $10^{-6}\leq x\leq 0.1$, and y is a number satisfying $0<y\leq 0.1$, as described in Japanese Unexamined Patent Publication No. 59(1984)-27980, a phosphor represented by the formula $BaFX.xA:yEu^{2+}$ wherein X is at least one halogen selected from the group consisting of Cl, Br, and I, A is a calcination product of at least one compound selected from the hexafluoro compound group consisting of salts of hexafluoro silicic acid, hexafluoro titanic acid, and hexafluoro zirconic acid with monovalent or bivalent metals, x is a number satisfying $10^{-6}\leq x\leq 0.1$, and y is a number satisfying $0<y\leq 0.1$, as described in Japanese Unexamined Patent Publication No. 59(1984)-47289, a phosphor represented by the formula $BaFX.xNaX':aEu^{2+}$ wherein each of X and X' is at least one of Cl, Br, and I, x is a number satisfying $0<x\leq 2$, and a is a number satisfying $0<a\leq 0.2$, as described in Japanese Unexamined Patent Publication No. 59(1984)-56479, a phosphor represented by the formula $M''FX.xNaX':yEu^{2+}:zA$ wherein $M''$ is at least one alkaline earth metal selected from the group consisting of Ba, Sr, and Ca, each of X and X' is at least one halogen selected from the group consisting of Cl, Br, and I, A is at least one transition metal selected from the group consisting of V, Cr, Mn, Fe, Co, and Ni, x is a number satisfying $0<x\leq 2$, y is a number satisfying $0<y\leq 0.2$, and z is a number satisfying $0<z\leq 10^{-2}$, as described in Japanese Unexamined Patent Publication No. 59(1984)-56480, a phosphor represented by the formula $M''FX.aM'X'.bM''X''_2.cM'''X'''_3.xA:yEu^{2+}$ wherein $M''$ is at least one alkaline earth metal selected from the group consisting of Ba, Sr, and Ca, $M'$ is at least one alkali metal selected from the group consisting of Li, Na, K, Rb, and Cs, $M'''$ is at least one bivalent metal selected from the group consisting of Be and Mg, $M''''$ is at least one trivalent metal selected from the group consisting of Al, Ga, In, and Tl, A is a metal oxide, X is at least one halogen selected from the group consisting of Cl, Br, and I, each of X', X'', and X''' is at least one halogen selected from the group consisting of F, Cl, Br, and I, a is a number satisfying $0\leq a\leq 2$, b is a number satisfying $0\leq b\leq 10^{-2}$, c is a number satisfying $0\leq c\leq 10^{-2}$, and $a+b+c\geq 10^{-6}$, x is a number satisfying $0<x\leq 0.5$, and y is a number satisfying $0<y\leq 0.2$, as described in Japanese Unexamined Patent Publication No. 59(1984)-75200, a stimulable phosphor represented by the formula $M''X_2.aM''X'_2:xEu^{2+}$ wherein $M''$ is at least one alkaline earth metal selected from the group consisting of Ba, Sr, and Ca, each of X and X' is at least one halogen selected from the group consisting of Cl, Br, and I, and $X\neq X'$, a is a number satisfying $0.1\leq a\leq 10.0$, and x is a number satisfying $0<x\leq 0.2$, as described in Japanese Unexamined Patent Publication No. 60(1985)-84381, a stimulable phosphor represented by the formula $M''FX.aM'X':xEu^{2+}$ wherein $M''$ is at least one alkaline earth metal selected from the group consisting of Ba, Sr, and Ca, $M'$ is at least one alkali metal selected from the group consisting of Rb and Cs, X is at least one halogen selected from the group consisting of Cl, Br, and I, X' is at least one halogen selected from the group consisting of F, Cl, Br, and I, a is a number satisfying $0\leq a\leq 4.0$, and x is a number satisfying $0<x\leq 0.2$, as described in Japanese Unexamined Patent Publication No. 60(1985)-101173, a stimulable phosphor represented by the formula $M'X:xBi$ wherein $M'$ is at least one alkali metal selected from the group consisting of Rb and Cs, X is at least one halogen selected from the group consisting of Cl, Br, and I, and x is a number falling within the range of $0<x\leq 0.2$, as described in Japanese Unexamined Patent Publication No. 62(1987)-25189, and a cerium activated rare earth element oxyhalide phosphor represented by the formula LnOX:xCe wherein Ln is at least one of La, Y, Gd, and Lu, X is at least one of Cl, Br, and I, x is a number satisfying $0<x\leq 0.2$, the ratio of X to Ln, expressed in terms of the atomic ratio, falls within the range of $0.500<X/Ln\leq 0.998$, and a maximum wavelength λ of the stimulation spectrum falls within the range of 550 nm<λ<700 nm, as described in Japanese Unexamined Patent Publication No. 2(1990)-229882.

The stimulable phosphor represented by the formula $M''X_2.aM''X'_2:xEu^{2+}$, which is described in Japanese Unexamined Patent Publication No. 60(1985)-84381, may contain the additives described below in the below-mentioned proportions per mol of $M''X_2.aM''X'_2$:

$bM'X''$ wherein $M'$ is at least one alkali metal selected from the group consisting of Rb and Cs, X'' is at least one halogen selected from the group consisting of F, Cl, Br, and I, and b is a number satisfying $0<b\leq10.0$, as described in Japanese Unexamined Patent Publication No. 60(1985)-166379, $bKX''.cMgX_2.dM'''X'_3$ wherein $M'''$ is at least one trivalent metal selected from the group consisting of Sc, Y, La, Gd, and Lu, each of X", X, and X' is at least one halogen selected from the group consisting of F, Cl, Br, and I, b is a number satisfying $0\leq b\leq2.0$, c is a number satisfying $0\leq c\leq2.0$, d is a number satisfying $0\leq d\leq2.0$, and $2\times10^{-5}\leq b+c+d$, as described in Japanese Unexamined Patent Publication No. 60(1985)-221483, yB wherein y is a number satisfying $2\times10^{-4}\leq y\leq2\times10^{-1}$, as described in Japanese Unexamined Patent Publication No. 60(1985)-228592, bA wherein A is at least one oxide selected from the group consisting of $SiO_2$ and $P_2O_5$, and b is a number satisfying $10^{-4}\leq b\leq2\times10^{-1}$, as described in Japanese Unexamined Patent Publication No. 60(1985)-228593, bSiO wherein b is a number satisfying $0<b\leq3\times10^{-2}$, as described in Japanese Unexamined Patent Publication No. 61(1986)-120883, $bSnX''_2$ wherein X" is at least one halogen selected from the group consisting of F, Cl, Br, and I, and b is a number satisfying $0<b\leq10^{-3}$, as described in Japanese Unexamined Patent Publication No. 61(1986)-120885, $bCsX''.cSnX_2$ wherein each of X" and X is at least one halogen selected from the group consisting of F, Cl, Br, and I, b is a number satisfying $0<b\leq10.0$, and c is a number satisfying $10^{-6}\leq c\leq2\times10^{-2}$, as described in Japanese Unexamined Patent Publication No. 61(1986)-235486, and $bCsX''.yLn^{3+}$ wherein X" is at least one halogen selected from the group consisting of F, Cl, Br, and I, Ln is at least one rare earth element selected from the group consisting of Sc, Y, Ce, Pr, Nd, Sm, Gd, Tb, Dy, Ho, Er, Tm, Yb, and Lu, b is a number satisfying $0<b\leq10.0$, and y is a number satisfying $10^{-6}\leq y\leq1.8\times10^{-1}$, as described in Japanese Unexamined Patent Publication No. 61(1986)-235487.

Of the above-enumerated stimulable phosphors, the bivalent europium activated alkaline earth metal fluorohalide phosphor (e.g., BaFI:Eu), the europium activated alkali metal halide phosphor (e.g., CsBr:Eu), the bivalent europium activated alkaline earth metal halide phosphor containing iodine, the rare earth element-activated rare earth element oxyhalide phosphor containing iodine, and the bismuth activated alkali metal halide phosphor containing iodine exhibit light emission with a high luminance and therefore are preferable. The phosphors described above are capable of taking one the form of an acicular crystal and therefore are apt to have the problems with regard to the water vapor absorption. Accordingly, in cases where the transparent protective layer of the radiation image storage panel in accordance with the present invention is employed, the water vapor proof characteristics are capable of being efficiently imparted with respect to the phosphor described above.

The stimulable phosphor layer may be overlaid on the substrate with a known technique, such as the vacuum evaporation technique, the sputtering technique, or the coating technique.

With the vacuum evaporation technique, the substrate is located within a vacuum evaporation apparatus, and the vacuum evaporation apparatus is then evacuated to a degree of vacuum of approximately $10^{-4}$ Pa. Thereafter, at least one kind of stimulable phosphor is heated and evaporated with a resistance heating technique, an electron beam technique, or the like, and a layer of the stimulable phosphor is deposited to a desired thickness on the surface of the substrate. In this manner, the stimulable phosphor layer containing no binder is capable of being formed on the substrate. The vacuum evaporation process may be performed in a plurality of stages in order to form the stimulable phosphor layer. Also, in the vacuum evaporation process, a plurality of constituents for a desired stimulable phosphor may be co-evaporated by use of a plurality of resistance heaters or a plurality of electron beams. In this manner, the desired stimulable phosphor may be synthesized on the substrate, and the stimulable phosphor layer may thereby be formed on the substrate. After the vacuum evaporation process has been finished, the formed stimulable phosphor layer may be subjected to heat treatment.

With the sputtering technique, in the same manner as that in the vacuum evaporation technique, the substrate is located within a sputtering apparatus, and the sputtering apparatus is then evacuated to a degree of vacuum of approximately $10^{-4}$ Pa. Thereafter, an inert gas, such as an Ar gas or a Ne gas, acting as the gas for the sputtering is introduced into the sputtering apparatus, and the gas pressure in the sputtering apparatus is set at approximately $10^{-1}$ Pa. Thereafter, sputtering is performed with the stimulable phosphor being set as a target, and the stimulable phosphor is thereby deposited to a desired thickness on the surface of the substrate. As in the cases of the vacuum evaporation process, the sputtering process may be performed in a plurality of stages in order to form the stimulable phosphor layer on the substrate. Also, a plurality of targets constituted of different stimulable phosphors may be utilized and simultaneously or successively subjected to the sputtering in order to form the stimulable phosphor layer. Further, in the sputtering technique, when necessary, a gas, such as an $O_2$ gas, an $H_2$ gas, or a halogen gas, may be introduced into the sputtering apparatus, and a reactive sputtering process may thereby be performed. After the sputtering process has been finished, the formed stimulable phosphor layer may be subjected to heat treatment.

With the coating technique, the stimulable phosphor, a binder, and a solvent are intimately mixed together. In this manner, a coating composition, in which the stimulable phosphor has been dispersed uniformly in the binder solution, is prepared. Thereafter, the coating composition is uniformly applied onto the surface of the substrate. In this manner, a coating film is formed on the surface of the substrate. The operation for applying the coating composition onto the substrate may be performed by utilizing ordinary coating means, such as a doctor blade coater, a roll coater, or a knife coater.

As the binder utilized in the stimulable phosphor layer of the radiation image storage panel in accordance with the present invention, a thermoplastic elastomer, which has elasticity at normal temperatures and which exhibits fluidity when being heated, should preferably be employed. Examples of the thermoplastic elastomers include a polystyrene, a polyolefin, a polyurethane, a polyester, a polyamide, a polybutadiene, an ethylene-vinyl acetate copolymer, a polyvinyl chloride, natural rubber, fluorine rubber, a polyisoprene, a chlorinated polyethylene, a styrene-butadiene rubber, and silicone rubber. As the elastomer, ordinarily, an elastomer having a softening temperature or a melting temperature falling within the range of 30° C. to 300° C. is ordinarily employed. An elastomer having a softening temperature or a melting temperature falling within the range of 30° C. to 200° C. is more preferable. An elastomer having a softening temperature or a melting temperature falling within the range of 30° C. to 150° C. is most preferable.

Examples of the solvents include lower alcohols, such as methyl alcohol, ethyl alcohol, n-propyl alcohol, n-butyl alcohol, and diacetone alcohol; ketones, such as acetone, methyl ethyl ketone, methyl isopropyl ketone, and cyclohexanone; esters of lower fatty acids with lower alcohols, such as methyl acetate, ethyl acetate, and butyl acetate; ethers, such as ethylene glycol monopropyl ether; hydrocarbons, such as toluene, xylene, and cyclohexane; and mixtures of two or more of the above-enumerated solvents.

The mixing ratio of the binder to the stimulable phosphor in the coating composition varies for different characteristics desired for the radiation image storage panel, different kinds of the phosphors, and the like. Ordinarily, the mixing ratio of the binder to the stimulable phosphor is selected from the range between 1:1 and 1:100 (weight ratio). The mixing ratio of the binder to the stimulable phosphor should preferably be selected from the range between 1:8 and 1:40 (weight ratio).

The substrate may be constituted of a material selected from various kinds of materials known as substrates for conventional radiation image storage panels. In the conventional radiation image storage panels, such that the binding strength between the substrate and the stimulable phosphor layer maybe enhanced, or such that the sensitivity of the radiation image storage panel may be enhanced or an image having good image quality (with respect to sharpness and graininess) may be obtained with the radiation image storage panel, a high-molecular weight substance, such as gelatin, is applied onto the surface of the substrate, on which surface the stimulable phosphor layer is to be overlaid, in order to form an adhesive properties imparting layer, or a light reflecting layer constituted of a light reflecting substance, such as titanium dioxide, a light absorbing layer constituted of a light absorbing substance, such as carbon black, or the like, is formed on the surface of the substrate, on which surface the stimulable phosphor layer is to be overlaid. In the radiation image storage panel in accordance with the present invention, various such layers may be formed on the substrate. The layer constitution may be selected arbitrarily in accordance with the characteristics which the radiation image storage panel should have, and the like.

Also, as described in Japanese Unexamined Patent Publication No. 59(1984)-200200, such that an image having a high sharpness may be obtained, fine concavities and convexities may be formed on the surface of the substrate, on which surface the stimulable phosphor layer is to be overlaid. (In cases where the adhesive properties imparting layer, the light reflecting layer, the light absorbing layer, or the like, is formed on the surface of the substrate, on which surface the stimulable phosphor layer is to be overlaid, fine concavities and convexities may be formed on the surface of the layer formed on the substrate.)

In the manner described above, the formation of the stimulable phosphor layer on the substrate is completed. Ordinarily, the layer thickness of the stimulable phosphor layer falls within the range of 20 µm to 1 mm, depending upon the characteristics required of the radiation image storage panel, the kind of the stimulable phosphor, the mixing ratio of the binder to the stimulable phosphor, and the like. The layer thickness of the stimulable phosphor layer should preferably fall within the range of 50 µm to 500 µm.

EXAMPLES

The present invention will further be illustrated by the following non-limitative examples.

Example 1

<Formation of Transparent Protective Layer>

Ethylene glycol diacrylate was heated under reduced pressure and was thus degassed. Thereafter, the degassed ethylene glycol diacrylate was evaporated with heating under reduced pressure and agglomerated on a 6 µm-thick polyethylene terephthalate (PET) film, which had been cooled with a drum. Thereafter, the thus formed layer of the ethylene glycol diacrylate was crosslinked with UV light irradiation. In this manner, an organic layer having a thickness of approximately 1 µm was formed on the PET film. Silicon oxynitride was then deposited to a thickness of 350 angstroms on the organic layer with a plasma-enhanced CVD technique, and a transparent inorganic layer was thus formed on the organic layer. Further, on the thus formed transparent inorganic layer, an organic layer of the same organic material as that described above and a transparent inorganic layer of the same inorganic material as that described above were alternately formed. In this manner, a multi-layer structure comprising five layers (total thickness: approximately 9 µm) was formed on the PET film. The thus formed transparent protective layer having the multi-layer structure had an air transmission rate at 25° C. of 0.4 cc/m²·d and a water vapor transmission rate of 0.4 g/m²·d.

<Formation of Stimulable Phosphor Layer>

A region of one surface of a 8 mm-thick soda-lime glass plate acting as a substrate, which region was other than a marginal area (marginal area width: 10 mm), was subjected to concavity-convexity processing and reflection processing. The soda-lime glass plate was then located within a vacuum evaporation machine such that the processed surface of the soda-lime glass plate might stand facing the side of vacuum evaporation processing. Thereafter, an $EuBr_2$ tablet and a CsBr tablet were located at a predetermined position within the vacuum evaporation machine, and the vacuum evaporation machine was evacuated to a vacuum of $1\times10^{-3}$ Pa. The substrate was then heated with a heater to a temperature of 200° C. Thereafter, an electron beam was irradiated from an electron gun at an acceleration voltage of 4.0 kV to the $EuBr_2$ tablet and the CsBr tablet accommodated within a platinum boat. In this manner, a stimulable phosphor (CsBr:Eu) was deposited on the region of the one surface of the substrate, which region was other than the marginal area, at a rate of 4 µm/minute and to a thickness of 500 µm. In a dry atmosphere, the region in the vacuum evaporation machine was returned to the atmospheric pressure, and the substrate was taken out from the vacuum evaporation machine. It was confirmed that acicular stimulable phosphor crystals having a thickness of 5 µm and a length of 500 µm were densely deposited in an upright orientation on the substrate.

<Formation of Radiation Image Storage Panel>

In a dry atmosphere, a polyurethane adhesive agent was coated with line drawing utilizing a dispenser onto the marginal area of the substrate, on which marginal area the stimulable phosphor layer was not formed. Also, a frame-shaped glass spacer (mean thickness: 0.5 mm, width: 7 mm, a soda-lime glass plate formed with a float process and having been subjected to abrasive water jet processing) was adhered and press-fitted to the marginal area of the substrate. Thereafter, in a dry atmosphere, the adhesive agent was dried and hardened at a temperature of 80° C. in an oven. A polyurethane adhesive agent was then coated with line drawing utilizing a dispenser onto the glass spacer having been adhered to the substrate. Also, a transparent adhesive layer (layer thickness: 1.5 µm) was formed on a region on the PET film side of the transparent protective layer having been prepared previously, which region corresponded to an image-forming region of the stimulable phosphor layer. After the glass spacer adhering area had been subjected to plasma surface treatment, the transparent protective layer was laminated with the stimulable phosphor layer. The laminate was taken out from the dry atmosphere and was hardened at a temperature of 25° C. for a period of 24 hours and then at a temperature of 50° C. for a period of three days. In the manner described above, a radiation image storage panel, in which the stimulable phosphor layer had been sealed with glass and the transparent protective layer, was formed.

Example 2

A radiation image storage panel was formed in the same manner as that in Example 1, except for the steps described below. Specifically, the organic layers of the transparent protective layer were formed with a coating technique utilizing an acrylic resin, i.e. with a process wherein the acrylic resin was coated, dried, and crosslinked with UV light irradiation. Also, the total thickness of the transparent protective layer was set at 15 µm.

Example 3

A radiation image storage panel was formed in the same manner as that in Example 1, except that 11-layer structure was formed on the PET film as the multi-layer structure of the transparent protective layer, and the total thickness of the transparent protective layer was set at 13 µm.

Example 4

A radiation image storage panel was formed in the same manner as that in Example 1, except that an aluminum oxide layer acting as each of the transparent inorganic layers was deposited to a thickness of 200 angstroms with a sputtering technique.

Example 5

A radiation image storage panel was formed in the same manner as that in Example 1, except that a transparent acrylic resin adhesive agent was coated to a thickness of 1 mm onto the surface of the multi-layer structure of the transparent protective layer, i.e. to the surface on the side of the organic layer, and the transparent protective layer was then laminated with the stimulable phosphor layer.

Comparative Example 1

A radiation image storage panel was formed in the same manner as that in Example 1, except that four 12 µm-thick PET films, on each of which a silicon oxide film had been formed to a thickness of 500 angstroms with a vacuum deposition technique, were laminated together by using a transparent polyurethane resin layer (3 µm) between adjacent PET films, and a transparent protective layer (total thickness: 57 µm) was thereby formed.

(Evaluation Tests)

The radiation image storage panels having been formed in Examples 1 to 5 and Comparative Example 1 described above were evaluated with respect to light emission lowering rate and image sharpness. The results shown in Table 1 below were obtained. The light emission lowering rate and the image sharpness were measured in the manner described below.

<Light Emission Lowering Rate>

X-rays were irradiated to the radiation image storage panel, and energy from the X-rays was thus stored on the radiation image storage panel. Thereafter, linear stimulating rays were irradiated to the radiation image storage panel from the side of the transparent protective layer, and light emitted by the radiation image storage panel was detected with a line sensor. The intensity of the emitted light having thus been detected was taken as an initial value. Also, the radiation image storage panel was subjected to thermal processing, in which the radiation image storage panel was left to stand within a constant temperature vessel at a temperature of 55° C. and relative humidity of 95% for 30 days, and thereafter the measurement of the intensity of the emitted light (i.e., the value after thermal processing) was performed. The light emission lowering rate was calculated with the formula shown below.

Light emission lowering rate (%)={(initial value−value after thermal processing)/initial value}×100

<Image Sharpness>

X-rays having been produced at a tube voltage of 80 kVp were irradiated to the radiation image storage panel. Thereafter, the radiation image storage panel was scanned with stimulating rays having a wavelength of 650 nm, and the stimulable phosphor layer of the radiation image storage panel was thus stimulated with the stimulating rays to emit light. The emitted light was detected and converted into an electric signal. An image was then reproduced from the electric signal by use of an image reproducing apparatus, and the reproduced image was displayed on a displaying apparatus. The thus obtained image was analyzed with a computer, and a modulation transfer function (MTF) (frequency: 2 cycles/mm) of the image was obtained. A high MTF value represents high image sharpness.

The results shown in Table 1 below were obtained.

TABLE 1

|  | Thickness (µ) | Sharpness (%) | Light emission lowering rate (%) | Air transmission rate/water vapor transmission rate cc/m²/d/g/m²/d |
|---|---|---|---|---|
| Ex. 1 | 9 | 36 | 8 | 0.4/0.4 |
| Ex. 2 | 15 | 34 | 11 | 0.3/0.4 |
| Ex. 3 | 13 | 35 | 6 | 0.1/0.1 |
| Ex. 4 | 9 | 36 | 10 | 0.5/0.5 |
| Ex. 5 | 9 | 36 | 9 | 0.4/0.5 |
| Comp. Ex. 1 | 57 | 31 | 15 | 0.6/0.6 |

As clear from Table 1, the radiation image storage panel in accordance with the present invention is protected by the transparent protective layer having a low air transmission rate and a low water vapor transmission rate. Therefore, little deterioration due to moisture occurs with the stimulable phosphor layer. Accordingly, the radiation image storage panel in accordance with the present invention is capable of yielding an image of a high image sharpness and having a low light emission lowering rate. As a result, the radiation image storage panel in accordance with the present invention is capable of yielding an image of good image quality and having a high durability.

What is claimed is:

1. A radiation image storage panel, comprising a stimulable phosphor layer, which contains a stimulable phosphor, and a transparent protective layer overlaid on the stimulable phosphor layer,
wherein the transparent protective layer has a layer thickness of at most 25 μm and comprises at least four layers formed on a transparent protective layer support for supporting the transparent protective layer, the at least four layers comprising transparent inorganic layers and organic layers, which are located alternately.

2. A radiation image storage panel as defined in claim 1 wherein each of the transparent inorganic layers contains a compound selected from the group consisting of a metal oxide, a metal nitride, and a metal oxynitride, and is formed with a vacuum deposition technique.

3. A radiation image storage panel as defined in claim 1 wherein each of the organic layers is formed with a technique selected from the group consisting of a coating technique and a vacuum deposition technique.

4. A radiation image storage panel as defined in claim 2 wherein each of the organic layers is formed with a technique selected from the group consisting of a coating technique and a vacuum deposition technique.

* * * * *